US00RE36444E

United States Patent [19]

Sanchez-Frank et al.

[11] E Patent Number: Re. 36,444

[45] Reissued Date of Patent: Dec. 14, 1999

[54] SELECTING AND LOCATING GRAPHICAL ICON OBJECTS TO DEFINE AND CONFIGURE THE WORKSTATIONS IN DATA PROCESSING NETWORKS

[75] Inventors: Alejandra Sanchez-Frank; Martin J. Sirkin, both of Austin, Tex.

[73] Assignee: International Business Machines Corporation, Armonk, N.Y.

[21] Appl. No.: 08/806,227

[22] Filed: Feb. 24, 1997

Related U.S. Patent Documents

Reissue of:

[64] Patent No.: 5,394,522
Issued: Feb. 28, 1995
Appl. No.: 08/120,313
Filed: Sep. 13, 1993

U.S. Applications:

[63] Continuation of application No. 07/625,249, Dec. 10, 1990, abandoned.

[51] Int. Cl.[6] ..... G06F 3/00

[52] U.S. Cl. ..... 345/349; 395/200.5; 395/200.53; 345/969

[58] Field of Search ..... 345/326, 358, 345/969, 968, 970; 395/200.5–200.52, 200.53–200.56, 200.3

[56] References Cited

U.S. PATENT DOCUMENTS

| | | | |
|---|---|---|---|
| 4,813,013 | 3/1989 | Dunn | 345/349 X |
| 4,833,592 | 5/1989 | Yamanaka | 364/188 X |
| 4,864,492 | 9/1989 | Blakely-Kogel et al. | 395/200.5 X |
| 4,901,221 | 2/1990 | Kodosky et al. | 345/348 |
| 4,937,784 | 6/1990 | Masai et al. | 395/200.33 X |
| 4,942,540 | 7/1990 | Black et al. | 395/200.5 X |
| 5,002,491 | 3/1991 | Abrahamson et al. | 434/322 |
| 5,060,135 | 10/1991 | Levine et al. | 345/351 |
| 5,072,412 | 12/1991 | Henderson, Jr. et al. | 345/349 X |
| 5,101,425 | 3/1992 | Darland et al. | 379/34 |
| 5,109,486 | 4/1992 | Seymour | 395/200.54 |
| 5,261,044 | 11/1993 | Dev et al. | 345/348 X |
| 5,276,789 | 1/1994 | Besaw et al. | 345/356 X |
| 5,295,244 | 3/1994 | Dev et al. | 345/357 |

OTHER PUBLICATIONS

IEEE Network, *ANM: Automated Network Management System*, vol. 2, No. 2 Mar. 1988, M. Feridun et al, New York, pp. 13–19.

Hewlett–Packard Journal, *HP OpenView Windows: A User Interface for Network Management Solutions*, vol. 41, No. 2, Apr. 1990, Smith et al, US, pp. 60–65.

Jackson et al., "A Graphical Methodolgy for Simulating Communication Networks", IEEE, pp. 459–464, Apr. 1988.

Marsan et al., "Topnet", IEEE, pp. 1735–1747, Dec. 1990.

Carr, "Networks by Design", LAN Mag., pp. 38–48, Nov. 1990.

(List continued on next page.)

*Primary Examiner*—John E. Breene
*Attorney, Agent, or Firm*—Casimer K. Salys

[57] ABSTRACT

A system and method for configuring communication and database networks in a user friendly graphical environment and automatically generating related configuration files. In a preferred practice, the user defines multiple network workstation nodes using icons, specifies the resources associated with each icon, defines connections between icons using specified protocol constraints, validates the network so defined, and generates the associated configuration files for the respective workstation nodes. The workstations have requester/server capability for communication and database network operation. The configuration files for the respective workstations in the network are preferably distributed and installed using the network resources. The network topology information so created can be stored, retrieved and modified as necessary to suit the needs of an evolving network.

4 Claims, 11 Drawing Sheets

OTHER PUBLICATIONS

Harding, "Windows & Icons & Mice Oh My!", IEEE, pp. 337–342, Oct. 1989.

Chang et al., "A Network Status Monitoring System Using Personal Computer", Globecom '89, pp. 201–206, Nov. 1989.

Muralidhar et al., "Mapcon", IEEE, pp. 869–873, Jun. 1988.

Rizzo, "Monitoring Your Network", Mac User, p. 201(3), Aug. 1989.

Kramer, "Proteon Provides Net–Management Overview", PC Week, pp. 103(2), Nov. 1988.

Dupuy, "Nest", Comm. of the ACM, p. 63(12), Oct. 1990.

Lan Mag., pp. 23–26, 42, 162, Apr. 1989.

Millikin, "Proteon", Patricia Seybold's Network Monitor, p. 1(10), Aug. 1989.

Pompili, "HP Unveils Net–Management System", PC Week, p. C–4(1), Mar. 1988.

*TRADEMARK OF IBM CORP.

SELECTING AND LOCATING GRAPHICAL ICON OBJECTS TO DEFINE AND CONFIGURE THE WORKSTATIONS IN DATA PROCESSING NETWORKS

Matter enclosed in heavy brackets [ ] appears in the original patent but forms no part of this reissue specification; matter printed in italics indicates the additions made by reissue.

This is a continuation of application Ser. No. 07/625,249, filed Dec. 10, 1990, now abandoned.

BACKGROUND OF THE INVENTION

The present invention relates generally to the configuration of data processing networks. More particularly, the invention defines a computer program architecture and method of use for graphically defining a network and deriving configuration parameters for the node terminals of the network.

The configuration of multiple personal computers and workstations into networks, and with increasing frequency hierarchically ordered sets of networks, provides communication and information retention resources not available to independent workstations. Consequently, there exists a significant trend toward network use of workstations. Unfortunately, the industry remains fluid as to network protocols and includes as prevailing and representative communication networks Ethernet, Token-Ring, PC Network (trademark of IBM Corporation), IEEEE 802.2, Netbios, X.25, SDLC, and APPC. Furthermore, given that the network users expect database capability in addition to that of the communication, database requester and database server functions in workstations and bridges are similarly subject to particularization in the course of defining the composite network. Network definition is even further complicated by the common use of multiple communication boards interfacing distinctly differing networks in one or more of the node workstations.

The configuration of the individual workstations in networks to match communication and database protocols has routinely been the responsibility of a network administrator. As the number of network nodes, the number of internetwork bridges and variety of network protocols increase, it has become apparent that the network administrator needs computer assistance to define and revise networks, and to generate the appropriate configuration files for each of the workstation within the network.

U.S. Pat No. 4,864,492 recognized the need for assisting a network administrator. The patent thus provides a system and method for applying a knowledge based expert system to the creation of configuration parameters individualized to the workstations of complex networks. The knowledge of the expert system is used to provide a menu and control the selections available to the network administrator.

Another reference of some relevance is U.S. Pat No. 4,942,540. The subject matter in that patent relates to creating and selecting a communication path between a user's terminal and a destination terminal by selecting the communication parameters from a scrollable menu. Graphical representations of the terminals and path are depicted in response to different menu selections. Though network usage is noted, the teachings relate to the definition of a communication path between a pair of terminals, namely, between the user's local terminal and a single remote terminal.

The increased prevalence of networks with greater numbers of nodes, diverse communication protocols, and different functional modes, together with the bridging of multiple local area networks into wide area networks, has created an environment in which there is a need for graphically depicting networks having numerous nodes, for interactively specifying the connecting protocols between the nodes, and for automating the configuration of each workstation in the network based upon its capabilities, the modes of operation defined for the workstation, and the protocols specified for such modes of operation.

SUMMARY OF THE INVENTION

The present invention provides a system, a program architecture, and method of operation by which a network administrator can, as a first feature, graphically depict a network by defining a multiplicity of workstation nodes with respective hardware and operating system characteristics, can then define the protocols of the communication paths between the network workstations, and based upon such network of workstations and communication path constraints can thereafter generate configuration parameters for the operating systems of the respective workstations. A further variation of the invention allows the configuration manager to switch the modes of operation defined for the network, for example between a communication mode and a database mode, and thereupon selectively redefine the workstation and communication path characteristics for the combined modes of operation. A further refinement of the invention provides for the automated distribution of such network workstation configuration parameters as an element of configuring the network depicted by graphical representation. The network parameters are capable of being stored, recalled, redefined and retransmitting with relative ease by graphical manipulation.

These and other features of the invention will be understood and appreciated with greater specificity upon considering the detailed description which follows.

DESCRIPTION OF THE PREFERRED EMBODIMENT

Figure 1:
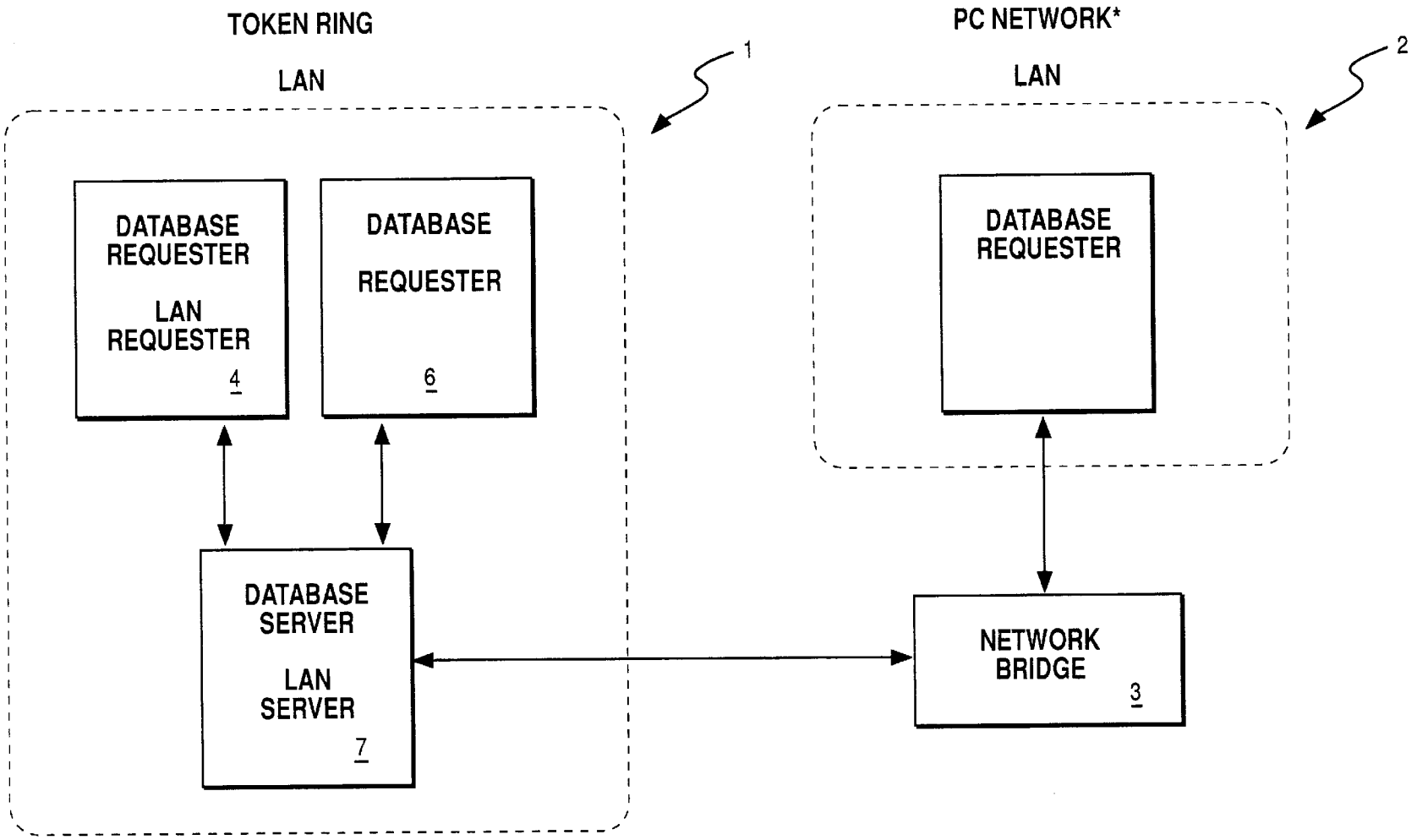
FIG. 1 schematically depicts a network environment relating to a use of the invention.

FIG. 1 schematically depicts an extended network, which has been simplified for purposes of illustrating the principles of the invention, composed of two local area networks, individually having different forms of workstations, which are joined through a network bridge. The composite network, often referred to as a wide area network (WAN), includes a token-ring local area network (LAN) at 1 and a PC Network LAN (PC Network is a trademark of IBM Corporation), generally at 2, communicating through network bridge 3. Token-ring LAN 1 is shown to have three nodes, including database and LAN requester node 4, database requester node 6, and database and LAN server node 7. The nodes are preferably configured with IBM brand PS/2

(trademark of IBM Corporation) workstations having appropriate OS/2 (trademark of IBM Corporation) operating system programs for accomplishing the prescribed functions LAN 2 is shown to have a single node database requester, again preferably configured with a PS/2 workstation having the appropriate database requester OS/2 operating system. Network bridge 3, which joins the two LANs and thus creates the WAN, is preferably configured with a PS/2 workstation employing a DOS operating system and running the Token-Ring Network Bridge Program application program, also available from IBM Corporation. It should be apparent that representative real world networks would include a significantly greater number of workstations nodes, connections and associated network protocols.

In the context of the network depicted in FIG. 1, the burden of the network administrator is to configure each of the workstations by prescribing and individually loading parameters such as node name, node operating system type, node machine type, node address, and available communication protocols suitable to accomplish the defined database requester, LAN requester, database server, LAN server or network bridge functions attributed to such workstation node within the network. As the number and diversity of the workstations and function increase, the complexity of the network and appropriate configuration definition increased exponentially. As the variety of hardware types, operating systems, protocols and modes of operation increase, menu driven tabulated entry of WAN information is error prone even with the assistance of an expert system. In part this can be attributed to the fact that the network administrator is not provided with a dynamically responsive visual representation of the interactions between network nodes, connections, protocols and modes of operation.

The present invention introduces the use of graphical representation to define network elements in the course of deriving configuration parameters. First, workstations within the network are graphically depicted as nodes having prescribed hardware operating system resources, and communication features. The graphically depicted connection of the nodes is overlayed, but only following a validation that the selected connections are functionally compatible with the previously specified node characteristics. For instances, and with reference to FIG. 1, the absence of a LAN server operating system in node 7 would preclude the designation of workstation 7 as a LAN server to workstation 4. Node 7 can still have the resources to provide database server functions for workstations 4 and 6.

Figure 2:
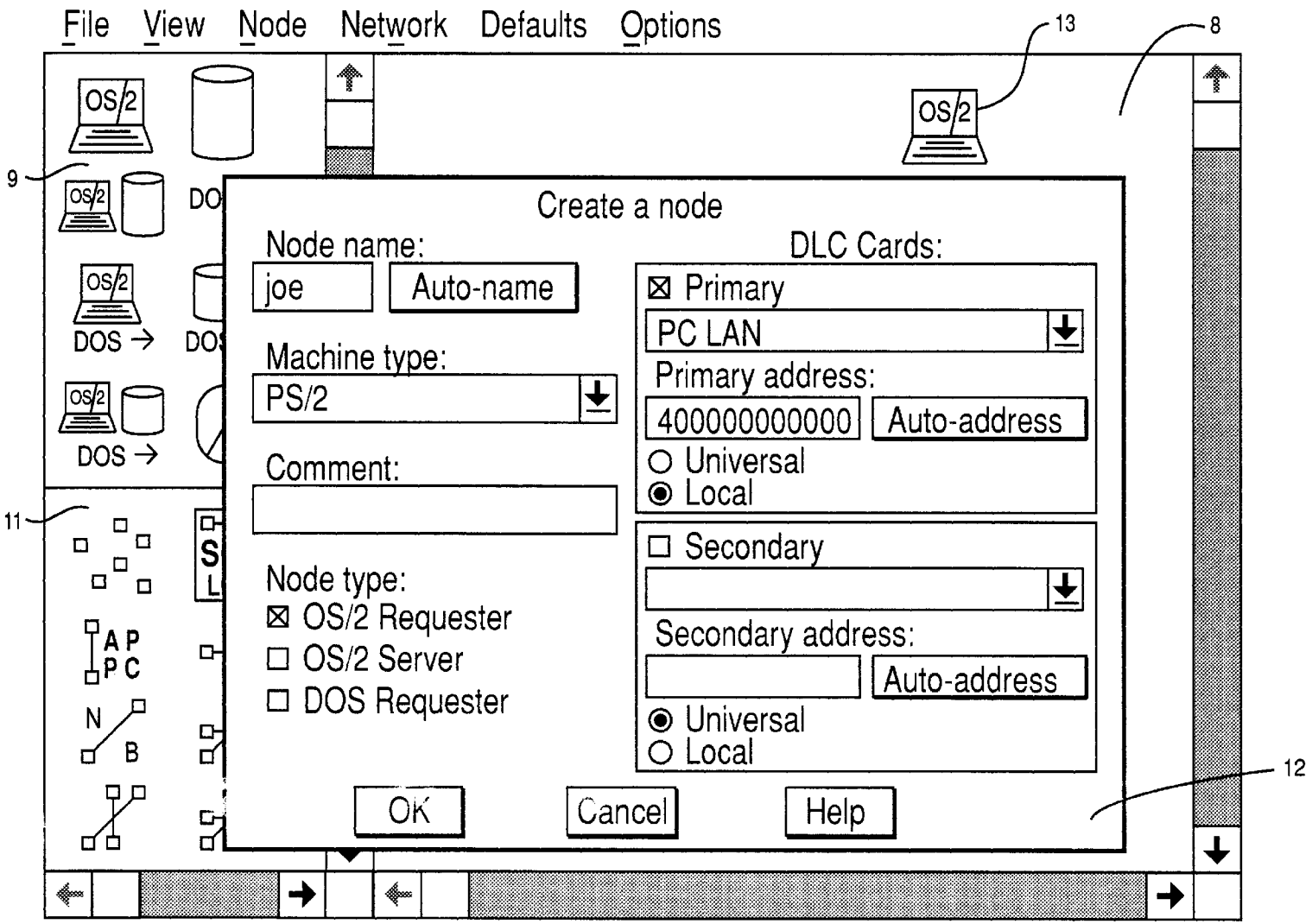
FIG. 2 schematically depicts a video display image of a network node and a related dialog window.

FIG. 2 depicts an early stage in a preferred use of the invention. The illustration presents an image as would appear on a video display of the workstation used by the network administrator. The screen includes a workspace pane, generally at 8, a workstation/communication link device/data storage device selection pane, generally at 9, and a network configuration and protocol definition pane, generally at 11.

The depiction in FIG. 2 also includes a window 12 overlapping the workspace, node selection, and connection selection panes. Window 12 is the dialog window associated with workstation 13, a workstation which was selected from the choices in pane 9 and placed in workspace 8 for purposes of specifying one node of a network. Note that the node dialog window 12 is used to specify the characteristics of the node in terms of machine type, node type and card (DLC) capability. As embodied, the dialog window 12 provides for name and address defaults together with resources for describing two distinct data link cards.

The invention preferably practiced using a PS/2 workstation having an OS/2 operating system and an IBM brand mouse pointing and control device. Using such mouse, the network administrator selects the workstation icon 13 from pane 9 and places it into work space 8 node in the network. Once the dialog information for window 12 has been entered by the administrator, the functional characteristics of node 13 are established.

Figure 3:
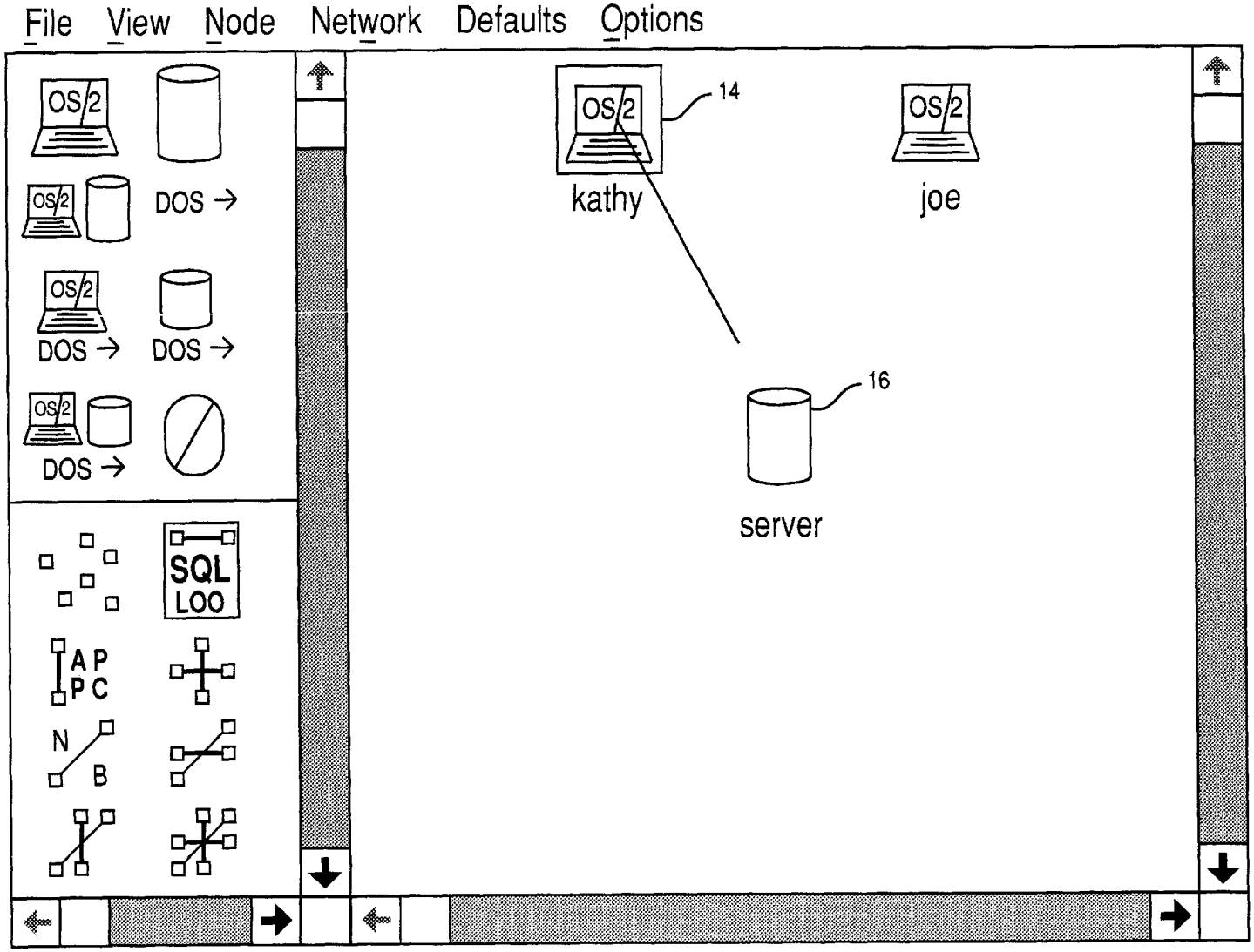
FIGS. 3 and 4 schematically depict video display images at differing stages of network definition.

FIG. 3 illustrates the image of the screen at a later stage in the definition of the network. At this stage an additional workstation 14 as well as database server 16 have been added to the network being defined. FIG. 3 also illustrates the commencement of a connection to be definition between workstation 14 and database server 16. A connection dialog window is not necessary in that the connection parameters are derivable by matching the connection network selected from pane 11 to the link card capabilities ascribed to each workstation node. The three node network depicted in FIG. 4 corresponds to the token-ring LAN identified at 1 in FIG. 1.

Figure 4:
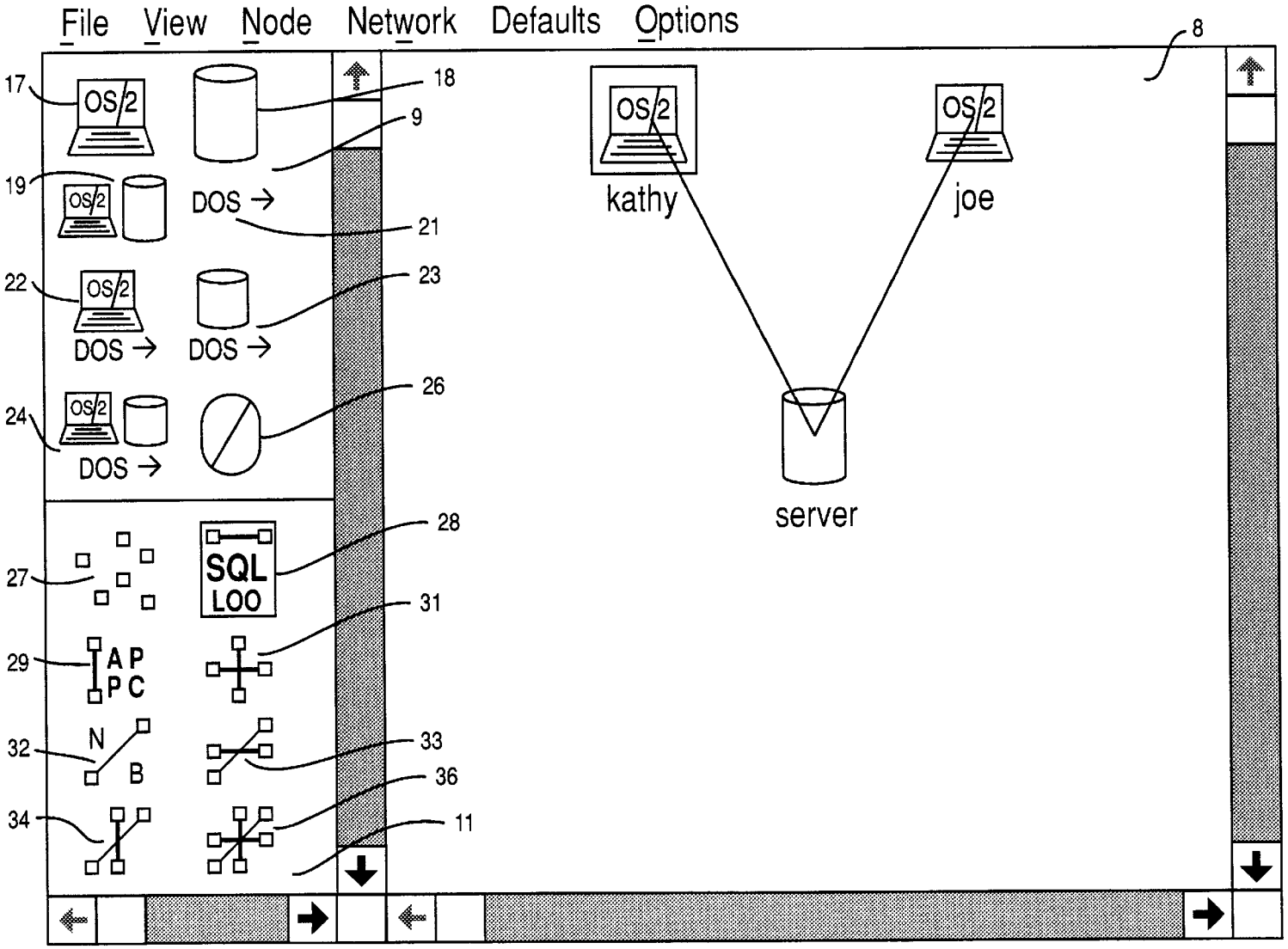

Pane 9 in FIG. 4 includes icons suitable to select an OS/2 operating system database requester workstation 17, an OS/2 operating system database server workstation 18, an OS/2 operating system database requester and server workstation 19, a DOS database requester workstation 21, an OS/2 or DOS operating system requester (whichever is booted) workstation 22, a DOS requester with OS/2 operating system database server workstation 23, and an OS/2 operating system requester and server with DOS requester workstation 24, and a "no function" overlay 26. The "no function" overlay icon identifies nodes without specific functionality in the network mode, e.g., communication or database, being defined. Such a diversity of node capability alone suggests a monumental effort for a network administrator not having the resources of the present invention.

The communication protocols available to link the node workstations are similarly diverse. The icons representing the various forms of connection protocol are depicted in pane 11 of FIG. 4. Icon 27 represents a no connection mode of operation, and invokes the mode use when selecting and dragging node icons from pane 9 into workspace pane 8. Connection icon 28 represents a SQL LOO communication LAN. The APPC (advance program to program communication) network represented by icon 29 corresponds to an IBM Corporation SNA communication network. The network of icon 31 represents the combined capability of the APPC and the SQL LOO protocols. Icon 32 corresponds to a netbios network, while network icon 33 represents a network combining SQL LOO with netbios. Icon 34 represents a network having APPC combined with netbios. Icon 36 represents the relatively all inclusive combination of APPC, SQL LOO, and netbios protocol capability network. Again, it should be clearly evident that a network administrator is burdened with an inordinate selection not only as to the node functions but now also as to the media of connection and communication between the nodes.

Figure 5:
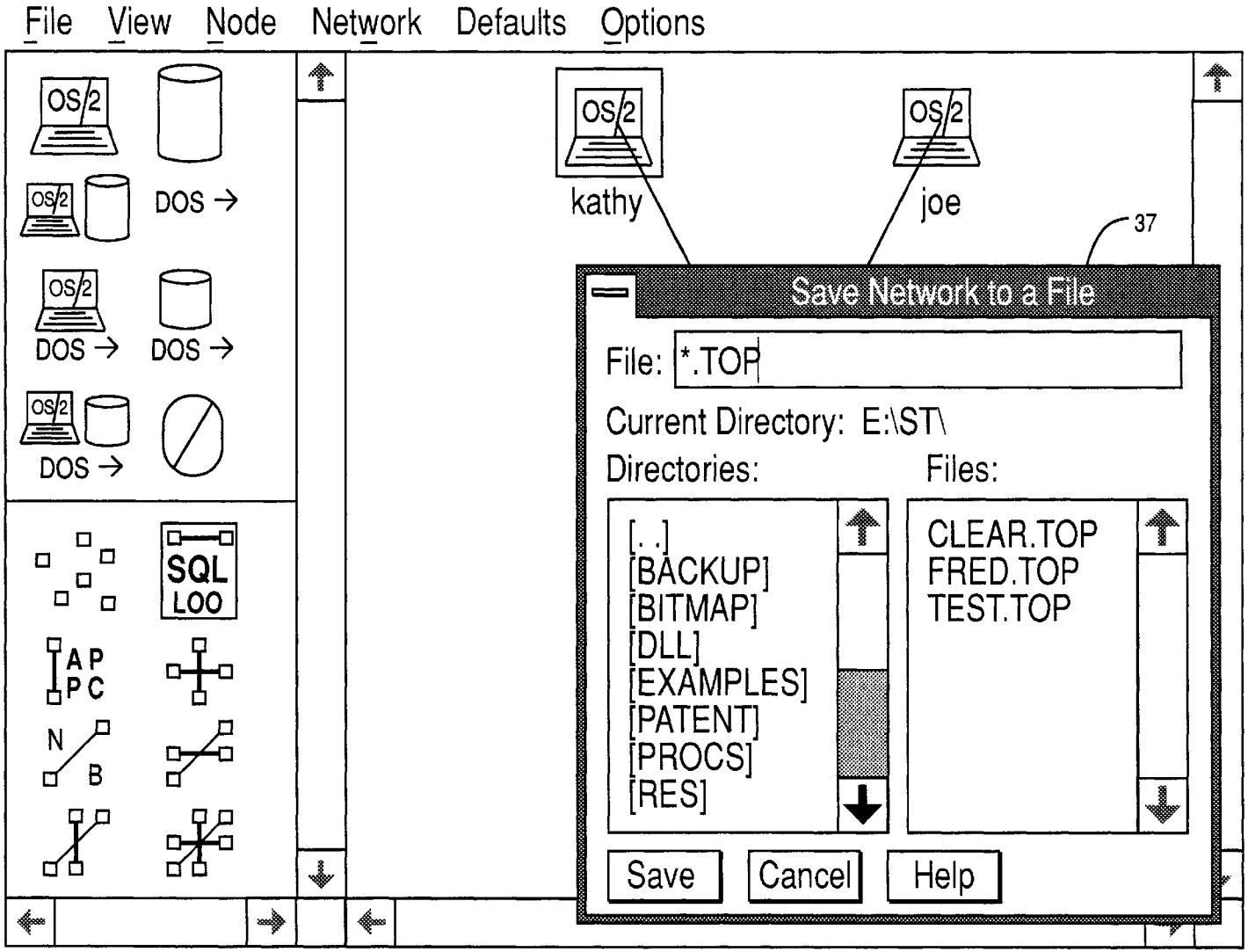
FIG. 5 schematically illustrates a video display image of the network including a dialog window suitable to save network configuration information.

According to the system, program, and method of the present invention, the administrator selects icons representing diverse workstation capabilities and interconnects such workstation nodes by selecting communication protocols. The nodes and connections are graphically depicted by icons and connecting lines or arrow patterns. The network can be manipulated as needed and is particularized by dialog windows with broad default capability. As depicted in FIG. 5, by the presence of window 37, the network configuration information can be stored and subsequently recalled for selecting refinement. The invention also contemplates a spreadsheet interface for very large networks, to permit easy replication of corresponding node functions and connection protocols. Direct transformation between spreadsheet parameters and graphical representations is readily accomplished by known transformation programs and methods.

As a further refinement of the invention, the node and connection characteristics are preferably validated at the time they are specified in the workstation used by the network administrator. Such validation will likely include a comparison of workstation resources and network requirements, a confirmation of uniqueness in node addresses and names, a verification of consistency between machine types and node functions ascribed thereto, and a comparison of connection protocols to workstation card functionality. Systematic and automated validation avoids the common prior experience of discovering configuration errors after configuring all the workstations and enabling the network.

Preferably validation extends to the whole of the network, thereby including all nodes and connections. Validation should be performed at the earliest opportunity, e.g., by validating the structure of a node when the node name is defined or by validating that two nodes can communicate with a given protocol when the connection is defined. Thus, the validation process is distributed among the operations which can be performed and invoked when first feasible. Validation also applies to the generation of configuration files, performed to ensure that an installation would be successful if undertaken.

The invention also contemplates the creation and ensuing distribution of the configuration files to the respective node workstations. The comprehensive definition of the complete network, including a wide area network, allows for the immediate generation of configuration files for each of the node workstations. Files are related to workstation directories. In a network having a requester/server capability, the present program and process contemplates the automated and direct distribution of configuration files from the workstation of the network administrator. In the absence of such LAN requester/server capability, floppy disks are generated for each network workstation. Thereafter, installation into each workstation becomes fairly mundane.

The network topology storage and recollection feature of the present invention provides the network administrator with the resources to update the network as changes occur in the node functions or connection protocols. New configuration files are thereafter installed manually or via the LAN requester/server distribution method described above. The invention contemplates that such updates be selectively limited to only those of the workstations within the network which have had configuration changes. Again, automated comparison in the context of exceptional workstation and connection protocol diversity reduces reconfiguration delays the likelihood of errors.

Flow diagrams representing the dominate features of the program and method to which the invention pertains are depicted in the succession of FIGS. 6–20. The letter "A" within a circle symbolizes a program state in which a user input is being sought. Text adjacent such symbols in a starting location describes the command provided by the user to initiate the ensuing operation. Such commands are derivatives of the menus appearing at the headings of the screen images depicted in FIGS. 2–5, or can be invoked by user manipulation of the keyboard or mouse. The features of the flow diagrams will be described briefly in the ensuing paragraphs.

Figure 6:
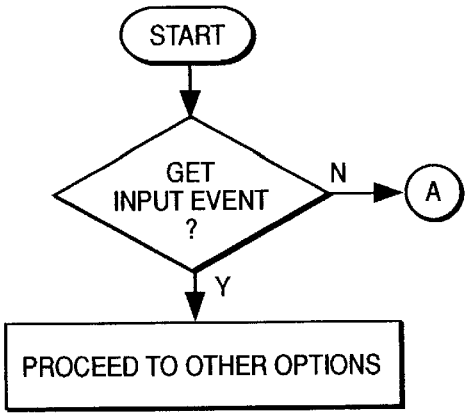
FIGS. 6–20 contain flow diagrams representing different functions available to a user of the present invention.
Figure 7:
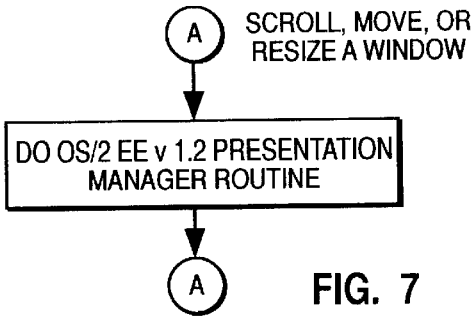
Figure 8:
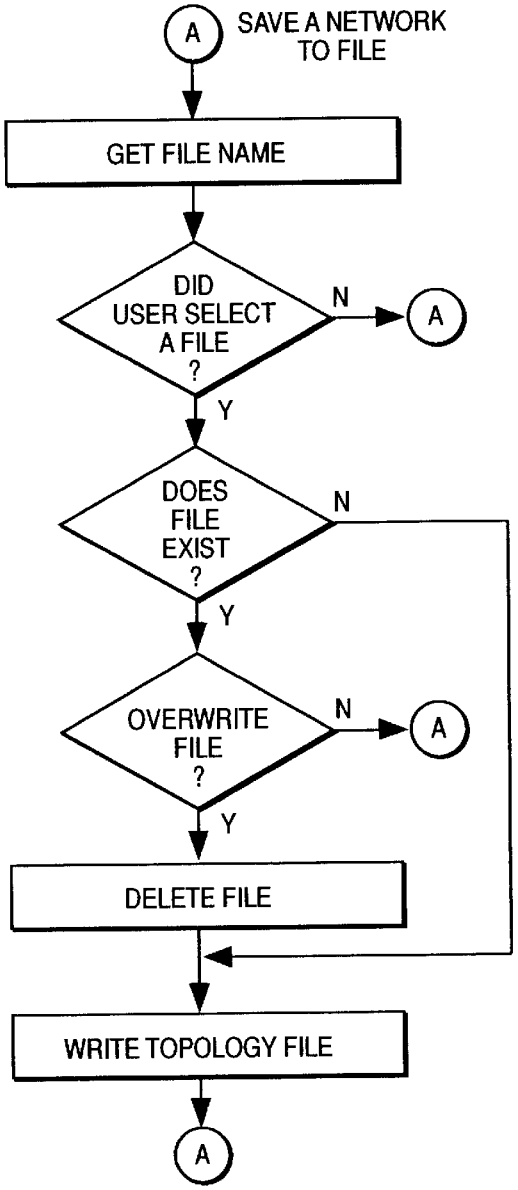
Figure 9:
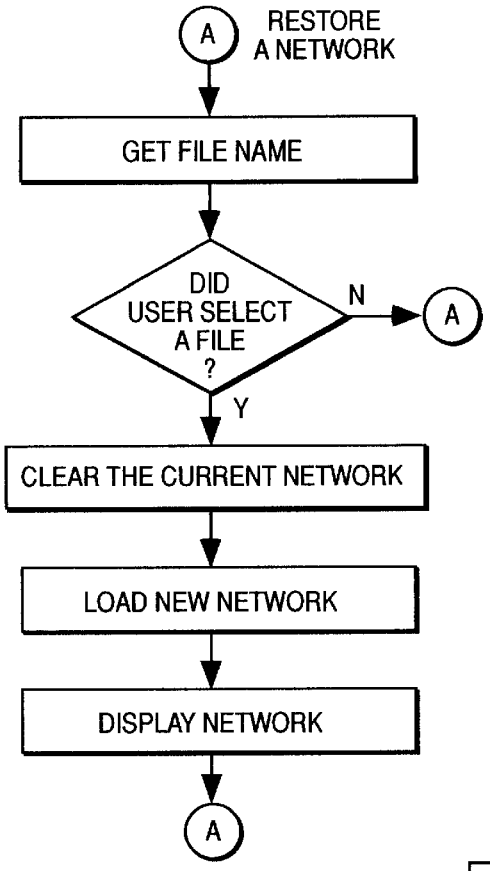
Figure 10:
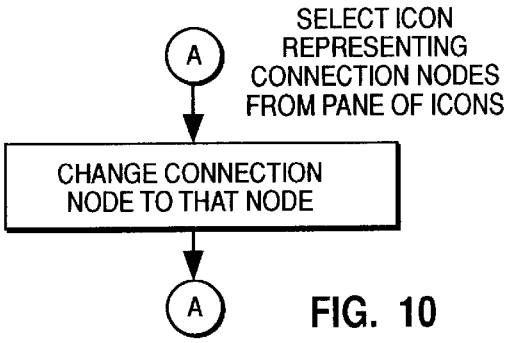
Figure 11:
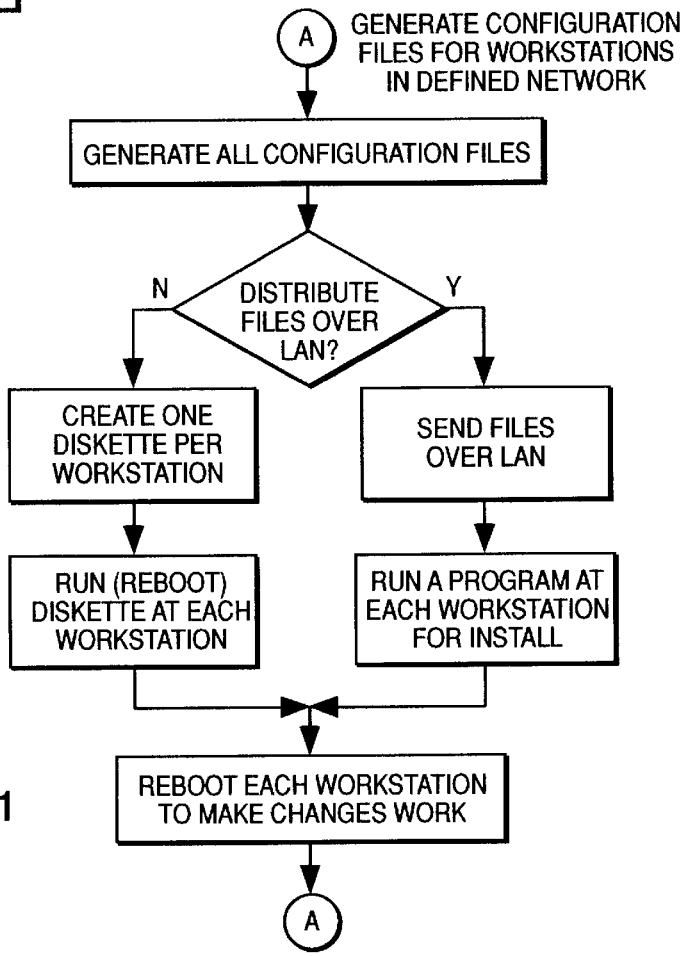

FIG. 6 relates to the start of the program. FIG. 7 involves a transition to an OS/2 Extended Edition Version 1.2 operating system Presentation Manager program routine as one might invoke to scroll, move or resize a window. FIG. 8 illustrates the sequence involved in saving a network depiction in a nonvolatile memory file, while FIG. 9 relates to the recall of such previously saved network data file. FIG. 10 relates to the selection of a node icon from the pane 9 (FIG. 4). FIG. 11 relates to the generation of configuration files for a network that has been defined, including the automated installation thereof for networks having the requisite LAN requester/server resources.

Figure 12:
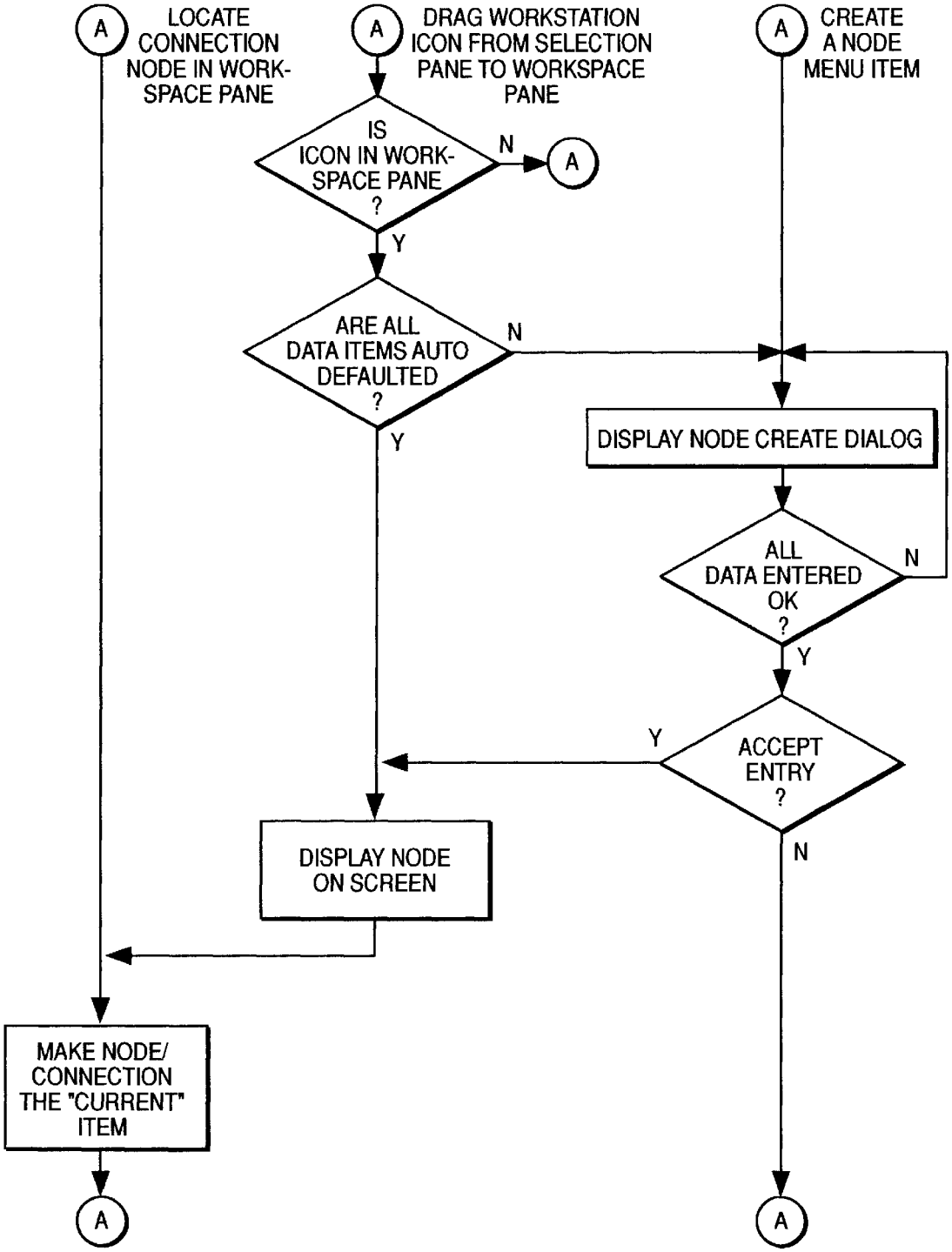
Figure 13:
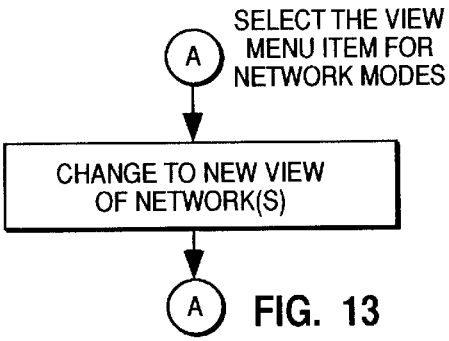
Figure 14:
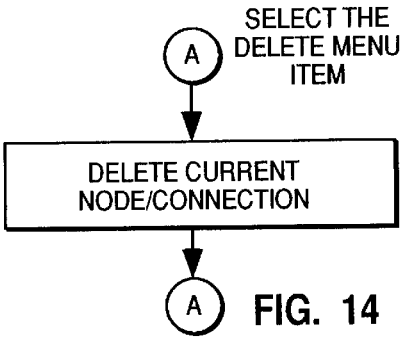
Figure 15:
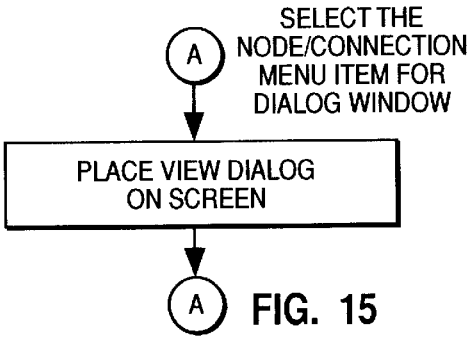
Figure 16:
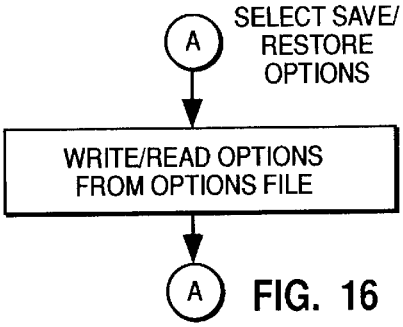
Figure 17:
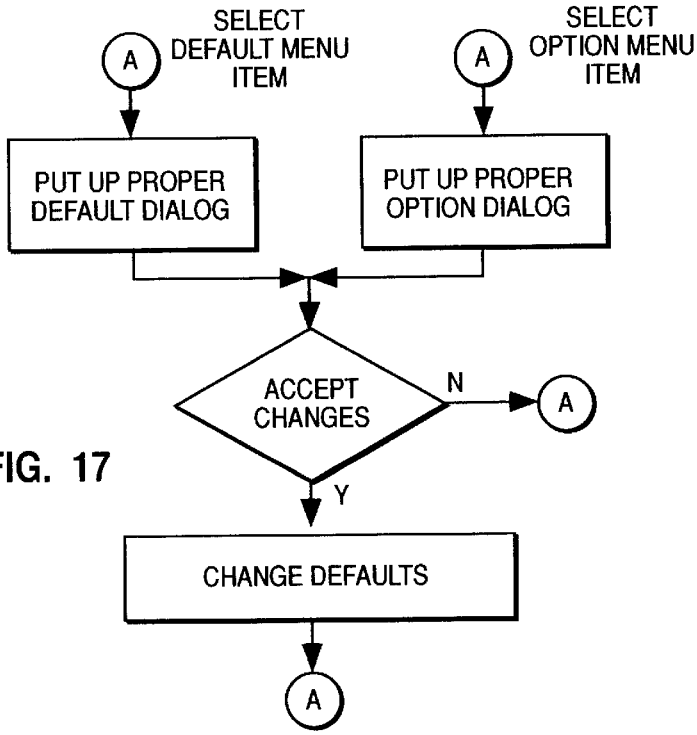

The flow diagram in FIG. 12 depicts the operations relating to the definition of a node within the workspace pane, and as such includes both its placement and functional dialog activity. FIGS. 13–16 relate to the view, delete, dialog, and save/restore menu options. FIG. 17 relates to the operations by which default parameters are defined.

Figure 18:
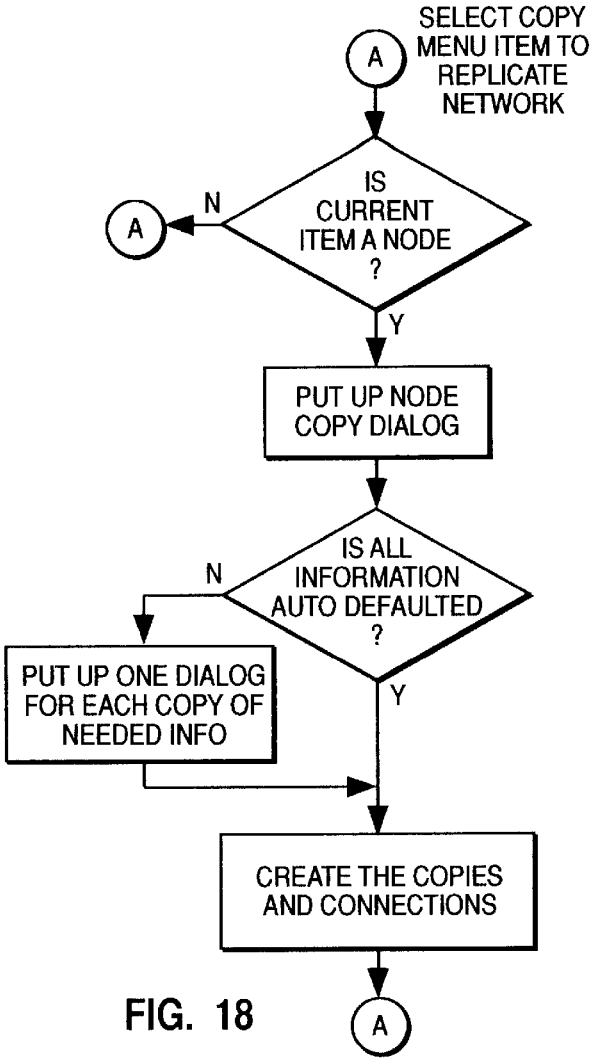

FIG. 18 depicts the operations of the program and method to replicate the network nodes for purposes of creating other nodes with similar properties and network connections, e.g., a database mode network versus a communication mode network. This is also where icon 26 (FIG. 4) is used to identify the presence of a workstation which lacks the resources to operate as a functional node within the context of the mode being defined. For instances, as a first mode the network can be defined in terms of communications capability. Thereafter, the same network of workstations can be redefined for purposes of database functionality. Thus, some nodes can be inoperative in one or the other network modes. The noted icon is used to identify to the network administrator and program the nodes which are inoperative to the mode under consideration.

Figure 19:
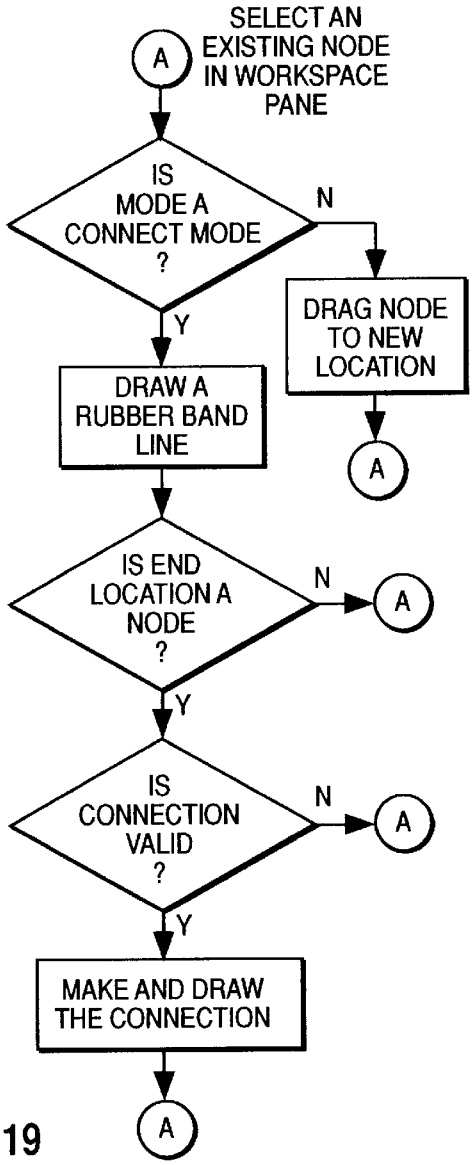
Figure 20:
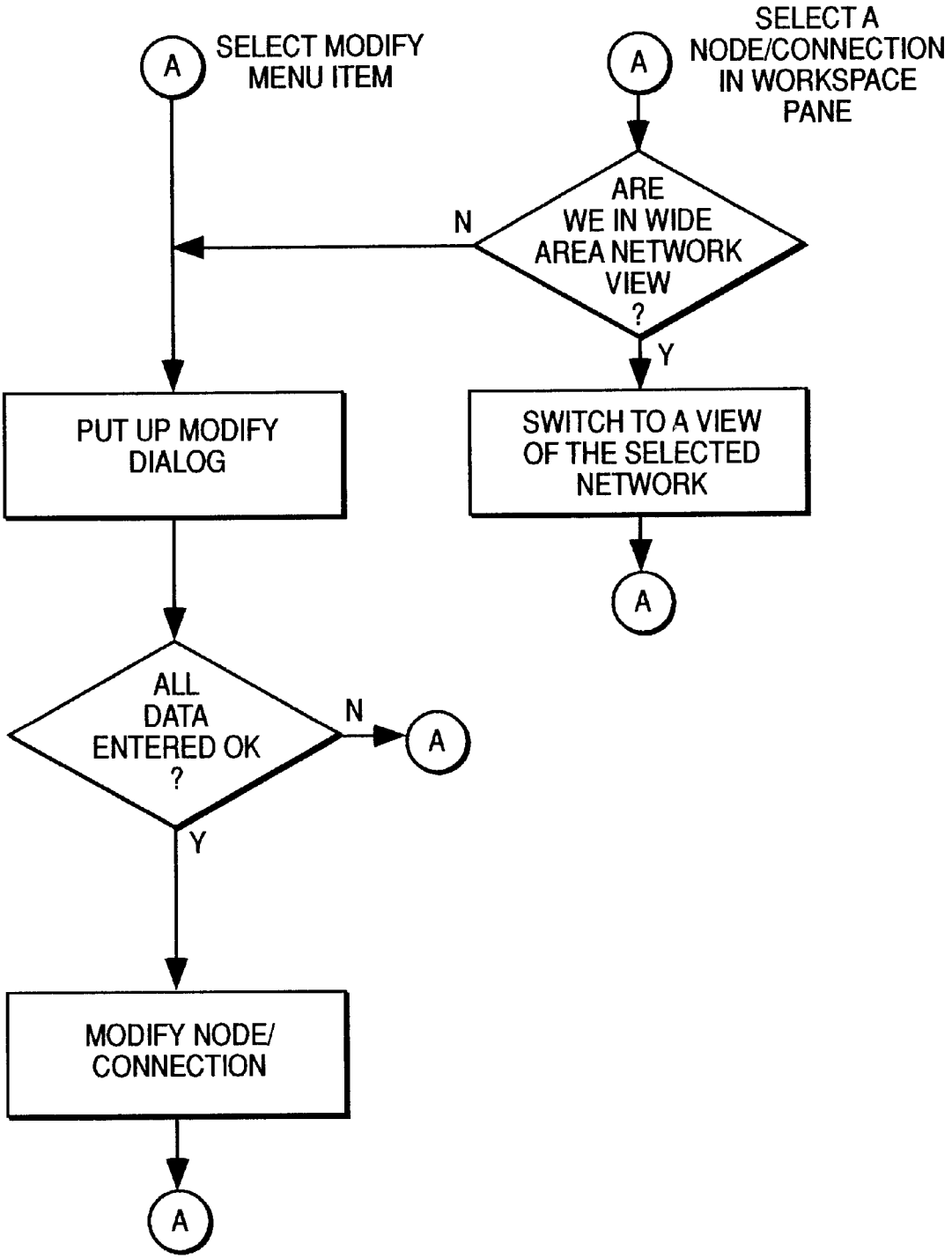

FIG. 19 sets forth the operations by which nodes in the workspace panel are connected according to defined protocols. FIG. 20 relates to the operations involved in modifying a previously defined network, and to translations between local and wide area network depictions.

The program of the present invention is further defined by pseudo code of a form and content suitable for one of skill in the art to derive source code to implement the operations as depicted by flow diagram and video display screen images.

START PROGRAM

1. Load in language specific files
2. Load in options files
3. Initialize all graphics variables, and display starting screen.
4. Gather user input.
5. Case (input) is:
   - A. Exit from program:
     1. Exit and close up files.
   - B. Scroll, resize or move a window:
     1. Scroll, resize or move a window.
   - C. Save a network menu item:
     1. Put up file dialog to select a file.
     2. If file selected . . .
        - A. If that file already exists . . .
          1. Ask if user wants to over-write.
          2. If so, write new topology file.
        - B. Else . . .
          1. Write the topology file.
   - D. Restore a network menu item:
     1. Put up file dialog to select a file.
     2. If file selected . . .
        - A. Clear the current network(s).

B. Load the new network(s) into memory.
C. Display the new network(s).

E. Generate configuration files menu item:
1. Generate all necessary files for all workstations.
2. If using LAN distribution . . .
A. Send files over LAN to proper workstations.
B. Run a remote program on each workstation to install the files.
C. Each workstation must be rebooted to use changes.
3. Else . . .
A. Create one diskette for each workstation.
B. Put each diskette into proper workstation.
C. Run a program (reboot) each workstation.
D. Each workstation must be rebooted to use changes.

F. Click on a node or connection in the right pane:
1. Make that node or connection the "current" one (highlight it).

G. Click on an icon below the line in the left pane:
1. Change the connection mode to that mode.

H. Drag an icon from above the line in the left pane:
1. If icon ends up in right pane . . .
A. If all data items are auto-defaulted . . .
1. Put new node on screen. Add to data structure.
B. Else . . .
2. Goto main item I.

I. Create a node menu item:
A. Put up the create node dialog.
B. If all data items entered OK . . .
1. If data accepted by user . . .
A. Put new node on screen. Add to data structure.

J. Change view menu item:
1. Change the screen view to the selected view.

K. Delete menu item:
1. Delete current node/connection from screen memory.

L. View a node/connection menu item:
1. Put up view node/connection dialog.

M. One of the default items menu items:
1. Put proper default dialog box.
2. If data changed . . .
A. If data is OK . . .
1. Change the default values.

N. One of the options menu items:
1. Put up proper option dialog box.
2. If data changed . . .
A. If data is OK . . .
1. Change the option values.

O. Save options menu item:
1. Write options to options file.

P. Restore options menu item:
1. Read in and change options from options file.

Q. Drag a node in the right pane:
1. If in a connection mode . . .
A. Draw a rubber band line.
B. If end location is in a different node . . .
1. If connection is valid . . . A. Make and draw the connection.
2. Else . . .
A. Drag node to new location.
B. Fix up screen image.

R. Double click a node/connection in right pane:
1. If in Wide Area Network View and click on a node . . .
A. Switch to a view of the selected node.
2. Else . . .
A. Put up modify node/connection dialog.
B. If data is changed and is valid . . .
1. Modify node/connection.
2. Change memory/screen image.

S. Modify menu item:
1. Goto item R.2.A

T. Copy menu item:
1. If current item is a node . . .
A. Put up the copy node dialog.
B. If data entered OK . . .
1. If all data is auto defaulted . . . A. Create the copies and connections. B. Update the screen and memory.
2. Else . . . A. Put up one dialog for each copy . . . B. If data entered is valid . . . 1. Create that copy in memory and on screen.

END PROGRAM

The present invention has by system, computer program, and method provided a network administrator, or one of like responsibility, with the resources for graphically defining and configuring a network, including sub-networks thereof, each composed of multiple nodes and connection paths. The respective nodes and connection paths are capable of exhibiting selectively diverse functionality. The network can be validated during design and subject to automated distribution as configuration files to respective network workstations. The network topology can be retained for subsequent revision and is subject to individualized configuration by mode, such as communication and database.

Though the invention has been described and illustrated by way of specific embodiments, the programs and methods should be understood to encompass the full scope of any structures and practices defined by the claims set forth hereinafter.

We claim:

1. A method by which a configuration workstation is used to generate configuration parameters for a network of workstations, comprising the steps of:

generating and positioning by drag-drop manipulation icons for each of three or more first network objects on a graphical video display of the configuration workstation;

generating graphical representations of paths and protocols connecting the first network objects on the video display;

generating parameters for configuring devices in a physical network responsive to a network defined by a first combination of network objects and connections; and distributing the configuration parameters *over the network,* from the configuration workstation to corresponding devices in the physical network.

2. The method recited in claim 1, further comprising the step of:

generating and positioning in a second functional mode icons and representations of paths and protocols corresponding to a second combination of network objects and connections, some of which icons and representations of paths and protocols in the second combination of network objects and connections correspond to the first combination of network objects and connections.

3. A system for generating parameters which create a network of multiple workstations, comprising:

means for graphically depicting network nodes on a workstation display using icon type objects which correspond by node;

means for graphically depicting path and protocol connections on the workstation display using graphical representations which relate to selected icon type objects;

means for a user of the workstation display to select and position by drag-drop manipulation the icon type objects and connections as depicted on the workstation display;

means for deriving network configuration parameters from information represented by a combination of the depicted icon type objects and connections; and means for distributing the network configuration parameters *over the network, from the means for deriving network configuration parameters to the multiple workstations*.

4. The system recited in claim 3, wherein the means for distributing network configuration parameters sends those parameters to physical devices which correspond to icon type objects.

* * * * *